United States Patent [19]

Cushman et al.

[11] 4,105,612

[45] Aug. 8, 1978

[54] ASPHALT COMPOSITION AND ITS MANUFACTURE

[75] Inventors: Donald Royal Cushman, Wenonah; Charles Anthony Pagen, West Deptford; John William Schick, Cherry Hill, all of N.J.; Tsoung-Yuan Yan, Philadelphia, Pa.

[73] Assignee: Mobil Oil Corporation, New York, N.Y.

[21] Appl. No.: 803,093

[22] Filed: Jun. 3, 1977

[51] Int. Cl.$^2$ .............................................. C08L 91/00
[52] U.S. Cl. ..................... 260/27 EV; 260/28.5 AS; 260/28.5 AV
[58] Field of Search ............... 260/28.5 AS, 28.5 AV, 260/27 EV

[56] References Cited

U.S. PATENT DOCUMENTS

| | | | |
|---|---|---|---|
| 3,442,841 | 5/1969 | Adelman | 260/28.5 AS |
| 3,821,144 | 6/1974 | Goyer et al. | 260/28.5 AS |

*Primary Examiner*—Melvyn I. Marquis
*Attorney, Agent, or Firm*—Charles A. Huggett; Hastings S. Trigg

[57] ABSTRACT

Asphaltic compositions are provided comprising a major proportion of straight-run asphalt, and minor proportions of a refractory aromatic residual fraction (syntower bottoms), ethylene-vinyl acetate copolymer and terpenic resin.

7 Claims, No Drawings

ASPHALT COMPOSITION AND ITS MANUFACTURE

BACKGROUND OF THE INVENTION

1. Field of the Invention

This invention relates to asphaltic compositions and, more particularly, to asphaltic compositions characterized by improved thermal stability and bright appearance.

2. Description of the Prior Art

It has heretofore been known to use asphalt binders for road building and various other industrial applications. Such products, however, have exhibited poor elasticity, thereby limiting their use in fields requiring supple and high mechanically resistant products. In order to increase the desired elasticity, it has been proposed to incorporate various additives in the asphaltic composition, such as copolymers of ethylene and vinyl acetate, as more particularly described in U.S. Pat. No. 3,442,841. While the addition of ethylene-vinyl acetate copolymers imparted increased elasticity to the resulting asphaltic compositions, it also unfortunately provided products exhibiting poor cohesion (i.e. stress necessary for a given deformation) and weak adhesiveness.

To enhance the latter properties while retaining desired elasticity characteristics, it has been proposed to provide an asphaltic composition comprising a major amount of straight-run asphalt, a minor amount of a copolymer of ethylene and vinyl acetate and a minor amount of a synthetic terpenic resin. Such compositions, which are the subject matter of U.S. Pat. No. 3,821,144, while providing distinctly improved products, have been lacking in desired thermal stability and appearance, with a dull surface haze characterizing the asphaltic compositions so produced.

In copending application Ser. No. 673,171, filed Apr. 2, 1976, now U.S. Pat. No. 4,064,082 there are disclosed asphalt compositions comprising a major amount of road (straight-run) asphalt and minor amounts of thermal asphalt, ethylene-vinyl acetate copolymer, and a terpenic resin. Such compositions evidence good heat stability, but, however, thermal asphalts are obtained from thermal cracking units. These units, widely used prior to World War II, have been largely replaced by catalytic cracking units which do not yield asphalt components as such.

SUMMARY OF THE INVENTION

In accordance with the present invention, there are provided improved asphaltic compositions of high thermal stability and bright appearance, while retaining good elasticity, cohesion and adhesiveness properties, thereby rendering the resulting products useful in a variety of applications, particularly as coatings for metal-work and orthotropic surfaces.

The improved asphaltic compositions of the present invention comprise a major proportion of straight-run asphalt, a minor proportion of syntower bottoms, a minor proportion of a copolymer of ethylene and vinyl acetate and a minor proportion of a terpenic resin. In a more specific embodiment, the asphaltic compositions described herein comprise, by weight, about 50 to about 90 percent straight-run asphalt, from about 5 to about 30 percent syntower bottoms, from about 5 to about 30 percent of a copolymer of ethylene and vinyl acetate and from 0 to about 20 percent of a terpenic resin.

DESCRIPTION OF SPECIFIC EMBODIMENTS

Straight-run asphalts utilized in the asphaltic compositions of this invention are characterized by a softening point (Ring and Ball) from about 40 to about 60° C. and an ASTM softening point-penetration index at 25° C. from about 40 to about 70. They are characterized by a rapid consistency change per degree of temperature and have a viscosity within the aforenoted softening point range of between about 200 and about 1000 centistokes at 275° F. These asphalts are normally obtained as residuals of atmospheric and/or vacuum distillation of conventional crude petroleum stocks.

Syntower bottoms utilizable herein are the still bottoms obtained in the distillation of the effluent from the Fluid Catalytic Cracking Process and are generally known as FCC syntower bottoms, often called FCC main column bottoms. These materials are refractory and highly aromatic. It has been found that FCC syntower bottoms contain low-boiling components that, when the bottoms was blended with straight-run asphalt compositions, rendered the compositions too soft and sticky. Accordingly the preferred FCC syntower bottoms used in the compositions of this invention are topped to a cut-off temperature of about 650° F., preferably about 800° F., i.e., they will have an initial boiling point (IBP) of about 650° F., preferably about 800° F.; all temperatures converted to atmospheric pressure.

The copolymers of ethylene and vinyl acetate, which are employed in the asphaltic compositions of the present invention preferably comprise from about 10 to about 50 percent by weight, of units derived from the copolymerized vinyl acetate. Particular preference are accorded those copolymers of ethylene and vinyl acetate which have a melt index of from about 20 to about 50, determined in accordance with ASTM Method D 638.

The terpenic resins employed in the asphaltic compositions of the present invention are those derived from terpenic raw materials such as turpentine, pine oil and related materials. The principal constituent of turpentine is terpene or pinene. The principal constituent of pine oil is a mixture of terpene alcohols (largely alpha terpineol) with small amounts of terpene hydrocarbons and ethers. The pine oil for such purpose is generally obtained by steam distillation of pine wood. In addition to the recovery of pine oil and turpentine as employed in the above process, other terpene hydrocarbons such as limonene, dipentene, terpinene and terpinolene are also obtained as intermediate fractions. The methods generally employed for producing resinous materials from the aforementioned substances involve oxidation or polymerization. Evaporation of turpentine and pine oils in open vessels yields resinous materials as a result of oxidation and polymerization. The terpenic resins utilized herein may either be of natural or synthetic origin. A more complete description of such resins and particularly the latter can be found in "The Chemistry of Synthetic Resins" by Carleton Ellis, Vol. I, Rheinhold Publishing Corporation, New York, N.Y. 1935. Preferably, the terpenic resin employed in the present asphalt compositions has a softening point (Ring and Ball) from about 50° to about 200° C. Particular preference is accorded those terpenic resins having a softening point (Ring and Ball) from about 95° to about 105° C. and a specific gravity at 25° C. of about 0.9 to about 1.03. Other typical characterizing properties are an acid number of less than 10 and an iodine number of about 30.

The novel asphaltic compositions described herein may be employed as such or in combination with various filler materials and inert aggregates, for imparting additionally desired properties to the composition. These fillers or aggregates, in combination with the aforementioned asphaltic compositions may typically comprise from about 85 to about 95 percent, by weight of the total asphaltic binder-aggregate mixture.

In the addition of ethylene-vinyl acetate copolymer/terpene resin mixture to straight-run asphalt and to FCC syntower bottoms, dramatic differences were observed in the appearance and nature of the resulting products. Thus, it was found that FCC syntower bottoms was considerably more receptive to the addition of ethylene-vinyl acetate copolymer/terpene resin than straight-run asphalt. The products containing FCC syntower bottoms were characterized by a high thermal stability and retained a bright appearance contrasted with the dull surface haze characterizing the ethylene-vinyl acetate/terpene resin/road asphalt mixtures.

Example

FCC syntower bottoms were topped in a molecular still to produce residual fractions at three different cut points: 800° F., 720° F., and 650° F. A series of asphalt compositions was prepared (Blends 2 through 6) containing straight run-asphalt, 20 weight percent ethylene-vinyl acetate copolymer (EVA), 5 weight percent of synthetic polyterpene resin (except Blends 5 and 6), and varying amounts of the FCC syntower bottoms residual fractions (each 20 weight percent, except for Blend 6). The ethylene-vinyl acetate copolymer was a commercially available resin having a melt index of 43 and a vinyl acetate content of 33 weight percent. The synthetic polyterpene resin (commercially available) had a softening point of 100 ± 5° C., an ash of less than 0.1%, an acid number of less than 1, an iodine number of 30, and a specific gravity of 0.93. The straight-run asphalt had a Specific Gravity, 77/77° F. of 1.044; Ring and Ball Softening Point 131° F.; viscosity at 210° F. 7154cs.; and Penetration 77° F./100/5 of 43.

Blends 2 through 6 were compared with Blend 1, which contained no FCC syntower bottoms, on the basis of physical characteristics before and after the Oven Test. Pertinent data and results are set forth in Table I.

In the normal handling of asphalt blends, wherein the product is mixed and used the same day, no problems arise. If, however, the blend is stored at elevated temperature (180° C.) for periods up to six days without mixing, separation (stratification) of components can occur. The susceptibility of an asphalt blend to stratify during hot storage is determined in the Oven Test.

OVEN TEST

Portions of the asphalt composition under test are poured into aluminum foil tubes and maintained upright in an oven at 180° C. (356° F.) for 6 days. After 6 days, each tube was cooled and the aluminum foil was peeled off. Then, each sample was cut in half to give top and bottom portions. Each portion was tested for viscosity at 275° F. and softening point. A large difference in viscosity between the top and bottom portions indicates stratification and poor thermal stability of the asphalt composition.

The Softening Point is determined by the Ring and Ball (R & B) method, using ASTM method D 36. Penetration is determined by ASTM method D5. Kinematic Viscosity is determined by ASTM method D 2170. Specific Gravity is determined by ASTM method D 71.

TABLE I

| Blend No. | 1 | 2 | 3 | 4 | 5 | 6 |
|---|---|---|---|---|---|---|
| | Reference | ← | Modified | Blends | → | |
| Formulation, Wt. % | | | | | | |
| Asphalt | 75.0 | 55.0 | 55.0 | 55.0 | 60.0 | 70.0 |
| EVA Polymer | 20.0 | 20.0 | 20.0 | 20.0 | 20.0 | 20.0 |
| Polyterpene | 5.0 | 5.0 | 5.0 | 5.0 | — | — |
| Aromatic Fractions from FCC syntower bottoms | | | | | | |
| 800° F Cut Point | | 20.0 | | | | |
| 720° F  "  | | | 20.0 | | 20.0 | 10.0 |
| 650° F  "  | | | | 20.0 | | |
| | 100.0 | 100.0 | 100.0 | 100.0 | 100.0 | 100.0 |
| Properties Before Oven Test | | | | | | |
| Penetration at 77° F. | 31 | 37 | 38 | 42 | 34 | 32 |
| Viscosity at 275° F., cs. | 24380 | 7084 | 9451 | 7055 | 8961 | 12388 |
| Softening Point, ° F. | 170 | 139 | 159 | 150 | 149 | 163 |
| Properties After Oven Test* | | | | | | |
| Top | | | | | | |
| Viscosity at 275° F., cs. | 14071 | 5421 | 7600 | 5897 | 8044 | 12636 |
| Soft Pt, ° F. | 149 | 138 | 145 | 141 | 145 | 149 |
| Bottom | | | | | | |
| Viscosity at 275° F., cs. | 38182 | 5506 | 10656 | 8042 | 9697 | 15845 |
| Soft Pt, ° F. | 150 | 138 | 145 | 142 | 145 | 148 |

*Six days at 356° F. in aluminum tubes, then cooled and cut in half (top and bottom).

From the data set forth in Table I, it will be noted that the reference Blend 1, without FCC syntower bottoms, showed a wide difference in viscosity between the top and bottom portions. This is indicative of severe stratification of the components. On the other hand, Blend 2, containing 800° F. cut point syntower bottoms, showed a small difference in viscosity between the top and bottom portions, indicating good homogeneity. Blends 3 and 4, containing lower cut point FCC syntower bottoms, showed somewhat larger differences in viscosity, but the differences are considered acceptably low. Blends 5 and 6 are also acceptable and further show that the terpene resin is not necessary for thermal stability when the asphalt composition contains FCC syntower bottoms.

Another way to monitor stratification during hot storage is by means of Infrared (IR) measurements at 1732 cm.$^{-1}$ wave number of the relative absorptivity of carbonyl (C=O) present mainly in the ethylene-vinyl acetate copolymer. Such measurements on the top and bottom portions of Blends 1 and 2 (Table I) after Oven Test are set forth in Table II.

TABLE II

| Relative Absorptivity at 1732 cm.$^{-1}$, carbonyl | Blend #1 Reference | Blend #2 (Contains Aromatic Fraction) |
| --- | --- | --- |
| Before Oven Test | 12.24 | 7.84 |
| After Oven Test | | |
| Top | 11.31 | 8.91 |
| Bottom | 9.55 | 8.67 |
| Increase (Top-Bottom) | 1.76 | 0.24 |
| % Increase | 18.4 | 2.8 |

From the data set forth in Table II, it will be noted that relative absorptivity measurements of top and bottom portions of Blend 1 show an increase of 18.4% of the top over the bottom portion. On the other hand, these measurements on Blend 2 show an increase of only 2.8% of the top over the bottom portion. This is a strong indication that much less stratification occurred in Blend 2 as compared to the reference Blend 1.

The novel asphaltic compositions of this invention are useful in waterproofing and particular applicable for use as coatings for orthotropic surfaces, e.g. as metallic bridge-paving materials where orthotropic plate superstructures are employed. These plates, longitudinally supported by a series of stiffeners separated from one another by specific distances, are referred to as orthotropic when their mechanical properties are not similar in two perpendicular directions. The pavement of these metallic bridges is subjected to stresses caused by vehicular traffic. These include vertical compressive stresses as well as horizontal stresses due to the strain applied by the weight of motor vehicles. The compositions described herein employed either individually or as binders for aggregate materials possess outstanding properties with respect to cohesiveness, elasticity, thermal stability and appearance and thus provide excellent bridge-paving materials, as well as being useful in other applications where the aforementioned properties are desired.

Although the present invention has been described with preferred embodiments, it is to be understood that modifications and variations may be resorted to while not departing from the spirit and scope of the present invention.

What is claimed is:

1. An asphaltic composition comprising a major proportion of straight-run asphalt, a minor proportion of Syntower bottoms topped to 650° F., a minor proportion of a copolymer of ethylene and vinyl acetate, and, optionally, a minor proportion of a terpenic resin.

2. The composition of claim 1 wherein the components are combined in the following approximate proportions by weight:
    Straight-run Asphalt: 50 to 90
    Syntower Bottoms: 5 to 30
    Copolymer of Ethylene and Vinyl Acetate: 5 to 30
    Terpenic Resin: 0 to 20

3. The composition of claim 1 wherein said Syntower bottoms is topped to 800° F.

4. The composition of claim 1 wherein said straight-run asphalt is characterized by a softening point (Ring and Ball) from about 40° to about 60° C., an ASTM softening point-penetration index at 25° C. from about 40 to about 70 and a viscosity between about 200 and about 1000 centistokes at 275° F.

5. The composition of claim 1 wherein said terpenic resin has a softening point (Ring and Ball) from about 50° C. to about 200° C.

6. The composition of claim 1 wherein the copolymer of ethylene and vinyl acetate comprises from about 10 to about 50 percent, by weight, of units derived from the copolymerized vinyl acetate.

7. The composition of claim 6 wherein said copolymer of ethylene and vinyl acetate has a melt index from about 20 to about 50

* * * * *